United States Patent
Abdoli et al.

(10) Patent No.: US 9,923,701 B2
(45) Date of Patent: Mar. 20, 2018

(54) METHOD AND APPARATUS FOR ASYNCHRONOUS OFDMA/SC-FDMA

(71) Applicant: Huawei Technologies Co., Ltd., Shenzhen (CN)

(72) Inventors: Javad Abdoli, Kanata (CA); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/960,167

(22) Filed: Dec. 4, 2015

(65) Prior Publication Data

US 2016/0094329 A1 Mar. 31, 2016

Related U.S. Application Data

(63) Continuation of application No. 14/231,217, filed on Mar. 31, 2014, now Pat. No. 9,419,770.

(51) Int. Cl.
*H04L 5/00* (2006.01)
*H04L 27/26* (2006.01)
(Continued)

(52) U.S. Cl.
CPC ............ *H04L 5/0066* (2013.01); *H04L 5/005* (2013.01); *H04L 7/06* (2013.01); *H04L 27/265* (2013.01);
(Continued)

(58) Field of Classification Search
CPC . H04L 27/265; H04L 27/2636; H04L 5/0066; H04L 7/06; H04W 72/0446;
(Continued)

(56) References Cited

U.S. PATENT DOCUMENTS 4,244,047 A * 1/1981 Perkins ................. H04B 3/542
370/482
4,863,613 A * 9/1989 Johnson .................... A23J 1/14
210/670
(Continued)

FOREIGN PATENT DOCUMENTS

CN 101405962 A 4/2009
CN 101860386 A 10/2010
(Continued)

OTHER PUBLICATIONS

Nikopour, H. et al., "Sparse Code Multiple Access," 2013 IEEE 24th International Symposium on Personal, Indoor and Mobile Radio Communications: Fundamentals and PHY Track, Sep. 8-11, 2013, pp. 332-336, London.

(Continued)

*Primary Examiner* — Warner Wong
(74) *Attorney, Agent, or Firm* — Slater Matsil, LLP

(57) ABSTRACT

Various disclosed embodiments include methods and systems for communication in a wireless communication system. A method comprises receiving a signal corresponding to a plurality of modulated signals, each of the plurality of modulated signals corresponding to a unique electronic device. The method comprises filtering the received signal with a plurality of filters, each of which is matched to a corresponding filter in a respective electronic device to obtain a filtered signal for the respective electronic device. The method comprises performing a fast Fourier transform (FFT) operation on the filtered signal to obtain demodulated data corresponding to the respective electronic device.

30 Claims, 11 Drawing Sheets

The spectrum of a band-pass signal

The spectrum of the signal after downsampling with the sampling rate 1/Ts

(51) Int. Cl.
*H04L 7/06* (2006.01)
*H04W 72/04* (2009.01)

(52) U.S. Cl.
CPC ..... *H04L 27/2636* (2013.01); *H04W 72/0446* (2013.01)

(58) Field of Classification Search
CPC ... H04W 72/00; H04W 72/04; H04W 72/082; G06F 17/141
See application file for complete search history.

(56) References Cited

U.S. PATENT DOCUMENTS

| | | | |
|---|---|---|---|
| 6,324,234 B1* | 11/2001 | Kiasaleh | H04L 7/027 375/355 |
| 6,434,133 B1 | 8/2002 | Hamalainen | |
| 7,657,429 B2 | 2/2010 | Tsushima | |
| 8,219,873 B1 | 7/2012 | Ng et al. | |
| 8,245,092 B2 | 8/2012 | Kotecha et al. | |
| 8,335,484 B1 | 12/2012 | Arad et al. | |
| 8,705,574 B2 | 4/2014 | Hammarwall et al. | |
| 8,719,654 B2 | 5/2014 | Kotecha et al. | |
| 8,737,509 B2 | 5/2014 | Yu et al. | |
| 9,055,484 B2 | 6/2015 | Feng et al. | |
| 2002/0105901 A1 | 8/2002 | Chini et al. | |
| 2004/0102222 A1 | 5/2004 | Skafidas et al. | |
| 2004/0218689 A1* | 11/2004 | Akhtman | H04L 27/2624 375/296 |
| 2005/0018837 A1 | 1/2005 | Duvaut et al. | |
| 2005/0053121 A1* | 3/2005 | Lakkis | H04L 1/06 375/130 |
| 2005/0111462 A1 | 5/2005 | Walton et al. | |
| 2005/0152475 A1 | 7/2005 | Lakkis | |
| 2005/0157801 A1 | 7/2005 | Gore et al. | |
| 2005/0201326 A1* | 9/2005 | Lakkis | H04B 1/71635 370/329 |
| 2005/0201473 A1* | 9/2005 | Lakkis | H04B 1/71637 375/260 |
| 2006/0077885 A1 | 4/2006 | Schnell et al. | |
| 2006/0087961 A1 | 4/2006 | Chang et al. | |
| 2006/0159006 A1 | 7/2006 | Yeon et al. | |
| 2006/0160498 A1 | 7/2006 | Sudo | |
| 2007/0218942 A1 | 9/2007 | Khan et al. | |
| 2008/0051090 A1 | 2/2008 | Kobayashi | |
| 2009/0124261 A1 | 5/2009 | Shimomura | |
| 2009/0196379 A1 | 8/2009 | Gan et al. | |
| 2009/0219977 A1 | 9/2009 | Iwamatsu | |
| 2009/0285122 A1 | 11/2009 | Onggosanusi et al. | |
| 2010/0027707 A1* | 2/2010 | Takahashi | H04B 1/0475 375/285 |
| 2010/0085934 A1 | 4/2010 | Wang et al. | |
| 2010/0093288 A1 | 4/2010 | Pan et al. | |
| 2010/0115358 A1 | 5/2010 | Kotecha et al. | |
| 2010/0220797 A1 | 9/2010 | Namba et al. | |
| 2010/0239040 A1 | 9/2010 | Beluri et al. | |
| 2011/0058471 A1 | 3/2011 | Zhang | |
| 2011/0087933 A1 | 4/2011 | Varnica et al. | |
| 2011/0158343 A1* | 6/2011 | Park | H04L 25/0228 375/285 |
| 2011/0170625 A1 | 7/2011 | Blankenship et al. | |
| 2011/0176499 A1 | 7/2011 | Siomina et al. | |
| 2011/0177499 A1 | 7/2011 | Quake et al. | |
| 2011/0182332 A1 | 7/2011 | Ericson et al. | |
| 2011/0261894 A1 | 10/2011 | Yu et al. | |
| 2011/0274123 A1 | 11/2011 | Hammarwall et al. | |
| 2012/0076204 A1 | 3/2012 | Raveendran et al. | |
| 2012/0170630 A1 | 7/2012 | Peroulas et al. | |
| 2012/0183020 A1 | 7/2012 | Koike-Akino et al. | |
| 2012/0224554 A1 | 9/2012 | Park | |
| 2012/0294382 A1 | 11/2012 | Wang et al. | |
| 2012/0300711 A1 | 11/2012 | Wang et al. | |
| 2013/0010849 A1* | 1/2013 | Shimizu | H04L 5/06 375/219 |
| 2013/0036338 A1 | 2/2013 | Kotecha et al. | |
| 2013/0094468 A1 | 4/2013 | Ko et al. | |
| 2013/0182791 A1 | 7/2013 | Dhakal et al. | |
| 2013/0188751 A1 | 7/2013 | Ohlmer et al. | |
| 2013/0286959 A1 | 10/2013 | Lou et al. | |
| 2014/0064147 A1 | 3/2014 | Wang et al. | |
| 2014/0140289 A1 | 5/2014 | Moulsley | |
| 2014/0162544 A1 | 6/2014 | Edge | |
| 2014/0226742 A1 | 8/2014 | Yu et al. | |
| 2014/0245094 A1 | 8/2014 | Kotecha et al. | |
| 2014/0254544 A1 | 9/2014 | Kar Kin Au et al. | |
| 2015/0003542 A1 | 1/2015 | Barbu et al. | |
| 2015/0131636 A1 | 5/2015 | Tanaka | |
| 2015/0181481 A1 | 6/2015 | Masini et al. | |
| 2015/0304868 A1 | 10/2015 | Yu et al. | |
| 2016/0112992 A1 | 4/2016 | Bhushan et al. | |

FOREIGN PATENT DOCUMENTS

| | | |
|---|---|---|
| CN | 101904103 A | 12/2010 |
| CN | 102232319 A | 11/2011 |
| CN | 102439866 A | 5/2012 |
| CN | 103067095 A | 4/2013 |
| CN | 103262453 A | 8/2013 |
| EP | 2479910 A2 | 7/2012 |
| JP | 2008054237 A | 3/2008 |
| JP | 2009526500 A | 7/2009 |
| JP | 2010517389 A | 5/2010 |
| RU | 2378800 C2 | 1/2010 |
| RU | 105491 U1 | 6/2011 |
| WO | 2007092945 A2 | 8/2007 |
| WO | 2007149961 A1 | 12/2007 |
| WO | 2008007437 A1 | 1/2008 |
| WO | 2010102435 A1 | 9/2010 |
| WO | 2012048218 A1 | 4/2012 |
| WO | 2013062310 A1 | 5/2013 |
| WO | 2014016944 A1 | 1/2014 |

OTHER PUBLICATIONS

Al-Imari, et al., "Low Density Spreading for next generation multicarrier cellular systems," 2012 International Conference on Future Communication Networks (ICFCN), pp. 52-57, Apr. 2-5, 2012.

Beko, M., et al., "Designing Good Multi-Dimensional Constellations," IEEE Wireless Communications Letters, vol. 1, No. 3, Jun. 2012, pp. 221-224.

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

Van De Beek, J., et al., "Multiple Access with Low-Density Signatures," Huawei Technologies Sweden, IEEE GLOBECOM, 2009 proceedings, 6 pages.

Zhang, et al., "A Survey on 5G New Waveform: From Energy Efficiency Aspects," IEEE, Date of Conference Nov. 2-5, 2014, pp. 1939-1943.

Qiang, Jianfeng et al., "Filter Bank Based Multiuser Receiver for Wireless OFDMA Systems", IEEE International Symposium on Microwave, Antenna, Propagation and EMC Technologies for Wireless Communications Proceedings, 2005, vol. 2, Aug. 8, 2005, pp. 1123-1126.

Tonello, Andrea M., "Performance Analysis of a Multiple Antenna Concatenated DMT-FMT Scheme in the Uplink", Wireless Communication Systems, 2nd International Symposium, Siena, Italy, Sep. 5-9, 2005, pp. 591-595.

Al-Imari, Mohammed, et al., "Performance Evaluation of Low Density Spreading Multiple Access", 2012, 8th International Wireless Communications and Mobile Computing Conference (IWCMC), Aug. 2012, pp. 383-388.

* cited by examiner

The spectrum of a band-pass signal

The spectrum of the signal after downsampling with the sampling rate 1/Ts

METHOD AND APPARATUS FOR ASYNCHRONOUS OFDMA/SC-FDMA

CROSS REFERENCE TO RELATED APPLICATIONS

This application is a continuation of U.S. patent application Ser. No. 14/231,217 filed Mar. 31, 2014.

TECHNICAL FIELD

The present disclosure is generally directed to asynchronous communication in a wireless communication system.

BACKGROUND

Orthogonal Frequency Division Multiple Access (OFDMA)/Single Carrier-Frequency Division Multiple Access (SC-FDMA) systems are prevalent today, Typically, in an OFDMA system, the signals of several different users (i.e., entities that wish to communicate over the communication system) will each be assigned one or more unique subcarriers. Each subcarrier is generated and transmitted in a manner that allows all of the subcarriers to be transmitted concurrently without interfering with one another. Therefore, independent information streams can be modulated onto each subcarrier whereby each such subcarrier can carry independent information from a transmitter to one or more receivers.

Conventional OFDMA/SC-FDMA systems use a rectangular pulse shape, i.e., sinc in frequency, which has high side lobes. As a result, there are stringent synchronization requirements to maintain orthogonality. Timing advance signaling is required for synchronous multiple access, causing overhead. This overhead increases with the number of transmitters, which is a consideration in applications such as machine-type communication where a plurality of machines communicate with a base station. Moreover, OFDMA/SC-FDMA is highly sensitive to carrier frequency offset (CFO) mismatch between different electronic devices.

One way to avoid the aforementioned issues is to use Orthogonal Frequency Division Multiplexing/Offset Quadrature Amplitude Modulation (OFDM/OQAM), which has become popular in the wireless community recently. However, using OFDM/OQAM has issues such as peak to average power ratio (PAPR), Multiple-Input Multiple-Output (MIMO) transmission, and time domain tails.

It would therefore be desirable to be able to provide a system that enjoys the benefits of OFDMA/SC-FDMA as its core waveform and yet offers the capability of asynchronous communication.

SUMMARY

According to one embodiment, there is provided a method of data transmission in a wireless communication system. The method comprises generating a signal corresponding to resource blocks assigned to an electronic device. The method comprises filtering the signal that corresponds to the resource blocks assigned to the electronic device with a spectrum shaping filter to reduce side lobe leakage in an adjacent frequency band to produce a filtered signal. The method comprises transmitting the filtered signal to a receiver in the communication system in a timeslot provided by a scheduler coupled to the receiver, the timeslot being independently determined with respect to other electronic devices communicating with the receiver.

In another embodiment, there is provided an electronic device for transmitting data in a wireless communication system. The electronic device comprises a modulator operative to generate a signal corresponding to resource blocks assigned to the electronic device. The electronic device comprises a spectrum shaping filter operative to filter the signal that corresponds to the resource blocks assigned to the electronic device to reduce side lobe leakage in an adjacent frequency band to produce a filtered signal. The electronic device comprises a transmitter operative to transmit the filtered signal to a receiver in the communication system in a timeslot provided by a scheduler coupled to the receiver, the timeslot being independently determined with respect to other electronic devices communicating with the receiver.

In another embodiment, there is provided a method of receiving a data transmission in a wireless communication system. The method comprises receiving a signal corresponding to a plurality of modulated signals, each of the plurality of modulated signals corresponding to a unique electronic device. The method comprises filtering the received signal with a plurality of filters, each of which is matched to a corresponding filter in a respective electronic device to obtain a filtered signal for the respective electronic device. The method comprises performing a fast Fourier transform (FFT) operation on the filtered signal to obtain demodulated data corresponding to the respective electronic device.

In another embodiment, there is provided an apparatus for receiving a data transmission in a wireless communication system. The apparatus comprises at least one processing device configured to receive a signal corresponding to a plurality of modulated signals, each of the plurality of modulated signals corresponding to a unique electronic device. The at least one processing device is configured to filter the received signal with a plurality of filters, each of which is matched to a corresponding filter in a respective electronic device to obtain a filtered signal for the respective electronic device. The at least one processing device is configured to perform a fast Fourier transform (FFT) operation on the filtered signal to obtain demodulated data corresponding to the respective electronic device.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
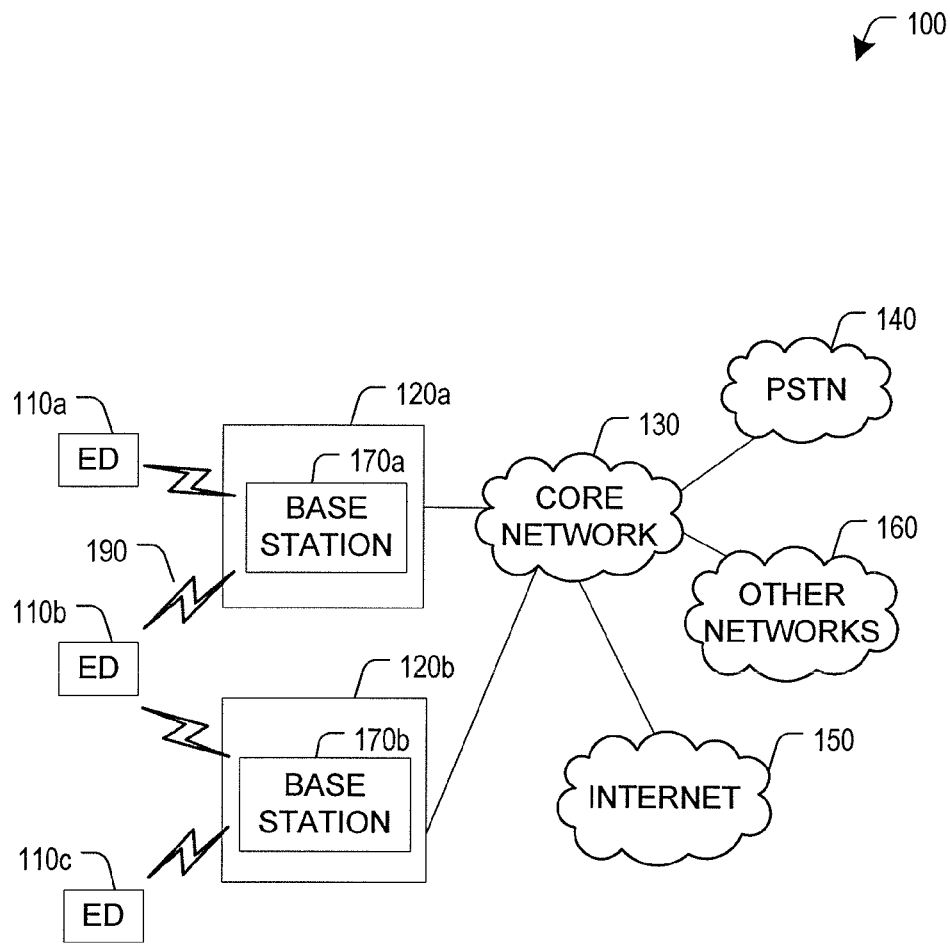
FIG. 1 illustrates an example communication system for asynchronous communication according to one embodiment.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
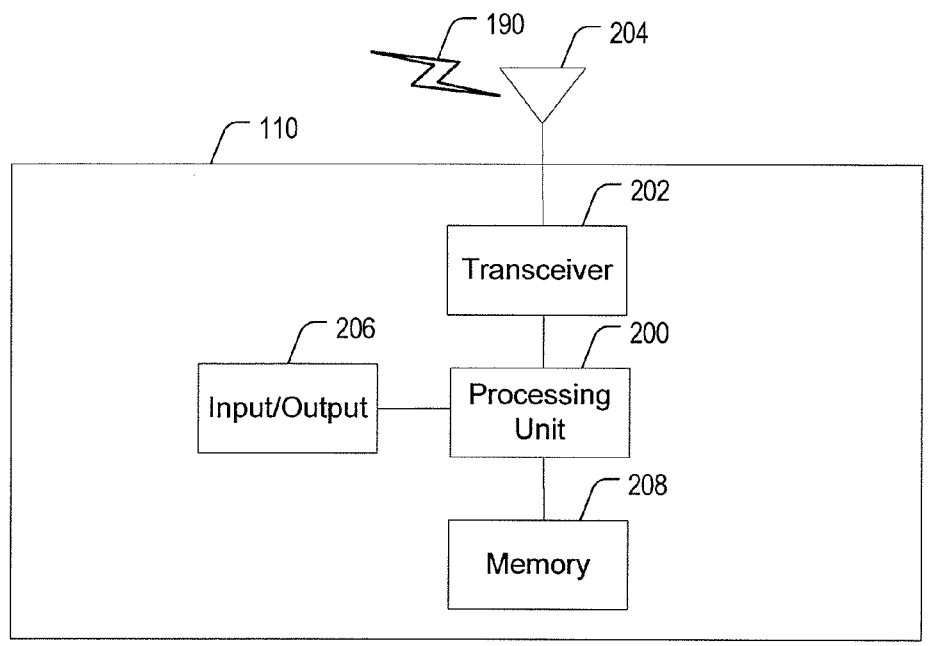
FIGS. 2A and 2B illustrate example devices that can implement asynchronous communication according to one embodiment.
Figure 2B:
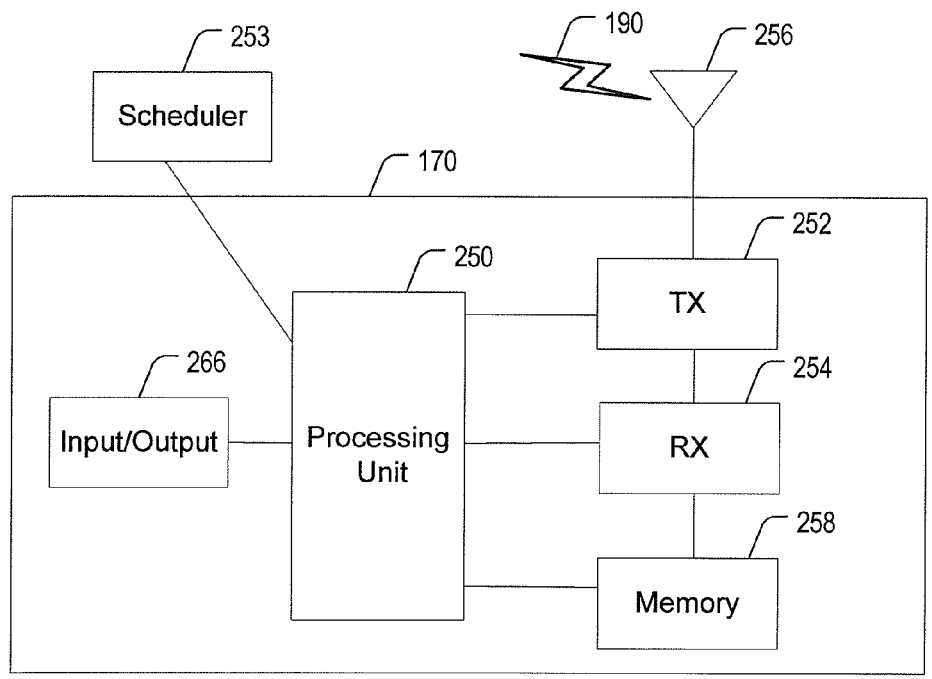

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Figure 3:
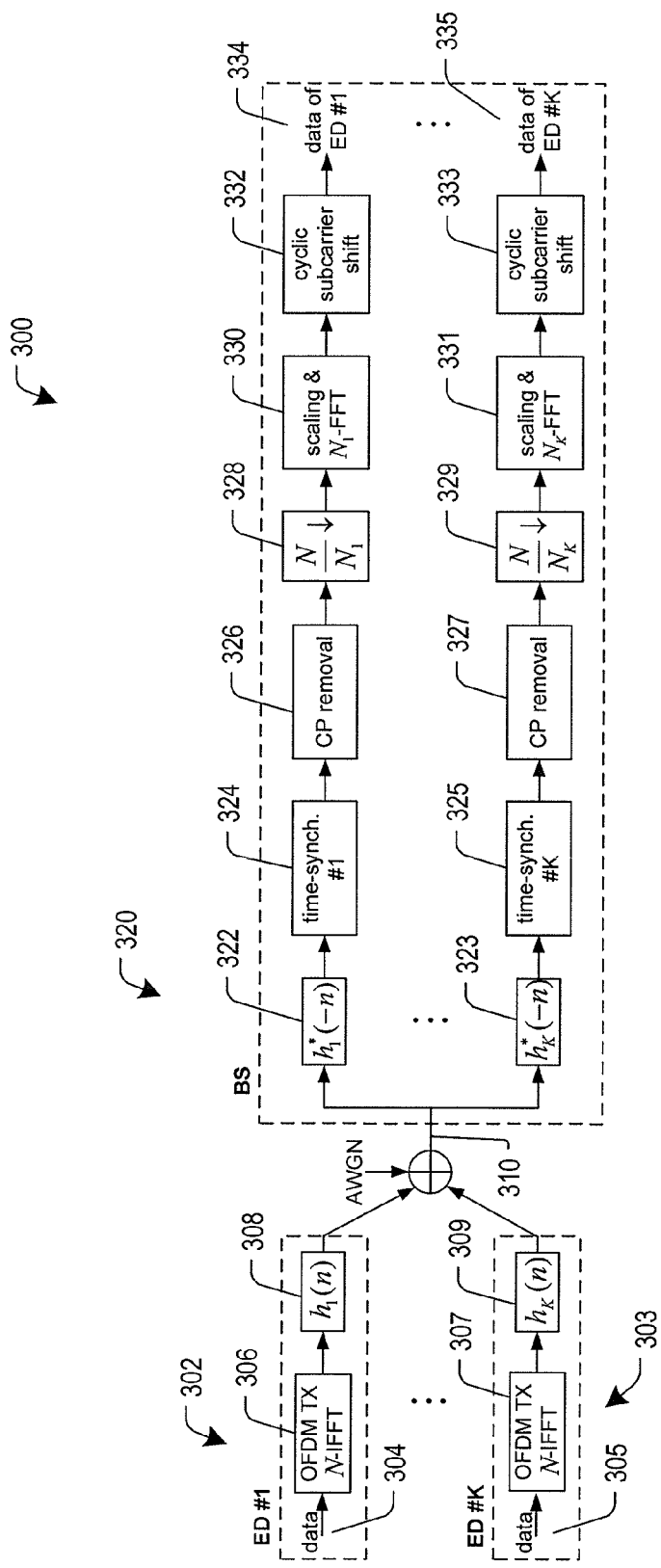
FIG. 3 illustrates an example of a topology or system for implementing asynchronous communication according to one embodiment.

FIG. 3 illustrates an example of a topology or system 300 for wireless transmission of data according to an embodiment of this disclosure. The system 300 comprises a plurality of electronic devices (EDs) 302 to 303 (e.g., ED #1 to ED #K) and at least one receiver 320. In some embodiments, each electronic device 302, 303 may comprise the electronic device 110 of FIG. 1 and the receiver 320 may comprise the base station 170 of FIG. 1. The techniques described herein may be used for an asynchronous system in which the receiver receives an asynchronous superposition of the signals of EDs. These techniques may also be used for a synchronous system in which the receiver receives a synchronous superposition of the signals of EDs.

Each ED 302, 303 comprises a respective OFDM modulator 306, 307 configured to receive respective data 304, 305 and a respective spectrum shaping filter 308, 309, The data 304, 305 may be a modulation data sequence, and the OFDM modulators 306, 307 include inverse fast Fourier transform (IFFT) blocks. The OFDM modulators 306, 307 may also include respective cyclic prefix (CP) generators (not shown).

Dining operation, each ED 302, 303 generates its modulated signal (which is the result of an WET operation on the modulation data sequence) corresponding to its assigned resource blocks. A resource block is a set of resource elements. Each resource element corresponds to a specific subcarrier in a specific OFDM symbol. For example, a resource block in LTE is defined as a set of 12×14=168 resource elements (e.g., 12 consecutive subcarriers in 14 consecutive OFDM symbols). The signal may be an OFDM signal, a DFTS-OFDM signal, or other signal. Thereafter, each ED 302, 303 passes its OFDM signal through its appropriately designed spectrum shaping filter 308, 309 in order to eliminate side lobe leakage to the adjacent electronic devices in frequency. One skilled in the art will appreciate that although reference is made to the elimination of a side lobe, the described methods and systems will also be applicable if the filter reduces or strongly attenuates the side lobes. Filtering makes the signal of each ED localized in frequency. The EDs are assigned to be beside each other in frequency so each signal after the filtering is localized to a certain level such that the amount of interference that EDs cause each other is negligible.

To illustrate, the spectrum shaping filter 308 is centered at the assigned resource blocks of ED #1, its bandwidth is equal to the total width of the resource blocks assigned to ED #1, and its time duration is equal to half of an OFDM symbol. Similarly, the spectrum shaping filter 309 is centered at the assigned resource blocks of ED #K, its bandwidth is equal to the total width of the resource blocks assigned to ED #K, and its time duration is equal to half of an OFDM symbol.

The spectrum shaping filters 308, 309 offer sharp side lobe leakage elimination so that the electronic devices 302, 303 do not cause interference to each other during asynchronous transmission. As an illustrative example, the spectrum shaping filter 308 may be a finite impulse response (FIR) filter or other suitable filter.

Each ED 302, 303 starts the transmission at any time—it does not need to be synchronized to other EDs. However, the receiver 320 needs to know when transmission occurs.

The modulated signals transmitted by each of the EDs 302, 303 pass through the communication channels and are received at the receiver 320 and combined, such that the receiver 320 receives a combined signal 310. As illustrated, the received signal 310 is passed through K chains of operations corresponding to the K EDs 302, 303. The output of each chain (e.g., 334, 335) is the demodulated sequence of the corresponding ED.

To illustrate, the receiver operation of the i'th chain includes filtering, where the received signal 310 is passed through a filter $h_i^*(-n)$, which is matched to the corresponding filter used at ED #i. The role of this matched filtering is twofold: firstly, it rejects the contributions of the other EDs from the signal 310. This ensures that the OFDM receiver (i.e., the subsequent FFT block in the chain), does not grab any interference from the neighboring EDs. Secondly, the matched filtering maximizes the received signal-to-noise ratio of ED #i.

For example, the receiver operation of the first chain includes filtering, where the received signal 310 is passed through a filter $h_1^*(-n)$ 322, which is matched to the filter 308 used at ED #1 302. Similarly, the receiver operation of the K'th chain includes filtering, where the received signal 310 is passed through a filter $h_K^*(-n)$ 323, which is matched to the filter 309 used at ED #K 303.

The receiver operation of the i'th chain includes per-ED time synchronization that is performed at a time synchronization block. For example, at the output of the filtering described above, the operational window is shifted appropriately to be time-synchronized to the corresponding ED. The appropriate time shift includes the delay of ED #i together with the aggregate delay of the end-to-end filter $g_i(n) \triangleq h_i(n)^*h_i^*(-n)$, i.e., the delay of its strongest tap, which is typically its middle tap. The beginning and end tails of the signal, due to the end-to-end filter $g_i(n)$, are truncated.

To illustrate, the receiver operation of the first chain includes time synchronization that is performed at a time synchronization block 324. At the output of the filter 322, a delay compensated signal is obtained by shifting the operational window appropriately to be time-synchronized to the corresponding ED (e.g., ED #1 302). The appropriate time shift includes the delay of ED #1 302 together with the aggregate delay of the end-to-end filter $g_1(n) \triangleq h_1(n)^*h_1^*(-n)$. The delay compensated signal is then divided into OFDM symbols, and the cyclic prefix (CP) is removed from each received OFDM symbol by the cyclic prefix removal block 326. Similarly, the receiver operation of the K'th chain includes time synchronization that is performed at a time synchronization block 325. At the output of the filter 323, a delay compensated signal is obtained by shifting the operational window appropriately to be time-synchronized to the corresponding ED (e.g., ED #K 303). The appropriate time shift includes the delay of ED #K 303 together with the aggregate delay of the end-to-end filter $g_K(n) \triangleq h_K(n)^*h_K^*(-n)$. The delay compensated signal is then divided into OFDM symbols, and the cyclic prefix (CP) is removed from each received OFDM symbol by the cyclic prefix removal block 327.

The receiver operation of the i'th chain includes down sampling that is performed at a down sampling block. For example, each OFDM symbol is down sampled with a factor of $N/N_i$, where N is the fast Fourier transform (FFT) size of each ED's OFDM symbol and $N_i \triangleq 2^{\lceil \log_2 M_i \rceil}$, with $M_i$ being the number of subcarriers assigned to the ED #i. Therefore, each resulting OFDM symbol has $N_i$ samples. The down sampling is done for the sake of receiver complexity reduction. The down sampling factor is chosen to satisfy Nyquist sampling criterion for reconstruction, with the constraint of $N_i$ being a power of 2 in order to enable the subsequent FFT.

For example, the receiver operation of the first chain includes down sampling that is performed at a down sampling block 328. Similarly, the receiver operation of the K'th chain includes down sampling that is performed at a down sampling block 329.

The receiver operation of the i'th chain includes scaling to account for the down sampling effect and the scaled signal is passed through an $N_i$-point FFT block (e.g., a "short" FFT) to transform each symbol to the frequency domain. For example, the receiver operation of the first chain includes scaling of the down sampled signal to account for the down sampling effect and the scaled signal is passed through an $N_1$-point FFT block 330. Similarly, the receiver operation of the K'th chain includes scaling of the down sampled signal to account for the down sampling effect and is passed through an $N_K$-point FFT block 331.

The receiver operation of the i'th chain includes a cyclic subcarrier shift that is performed at a cyclic subcarrier shift block to account for down sampling of the band-pass signals. For example, the receiver operation of the first chain includes a cyclic subcarrier shift that is performed at a cyclic subcarrier shift block 332. Similarly, the receiver operation of the K'th chain includes a cyclic subcarrier shift that is performed at a cyclic subcarrier shift block 333. The output of each chain (e.g., 334, 335) is the demodulated sequence of the corresponding ED.

Although FIG. 3 illustrates one example of a system 300 for wireless transmission of data according to an embodiment of this disclosure, various changes may be made to FIG. 3. For example, various components in FIG. 3 could be combined, further sub-divided, moved, or omitted and additional components could be added according to particular needs. Also, the system 300 could include any number of each component shown in FIG. 3.

Figure 4:
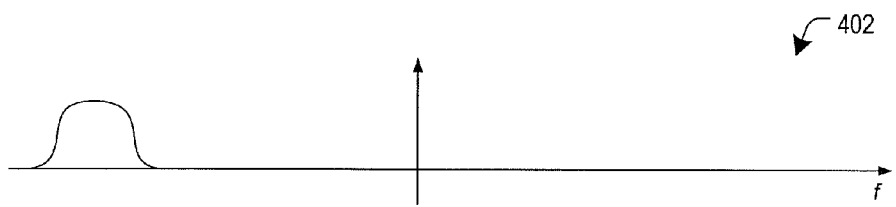
FIG. 4 illustrates the effect of down sampling on the spectrum of a band-pass signal.
Figure 4:
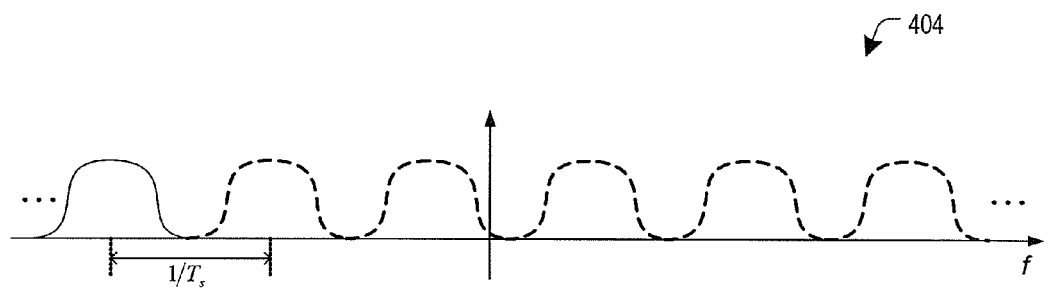
Figure 4:
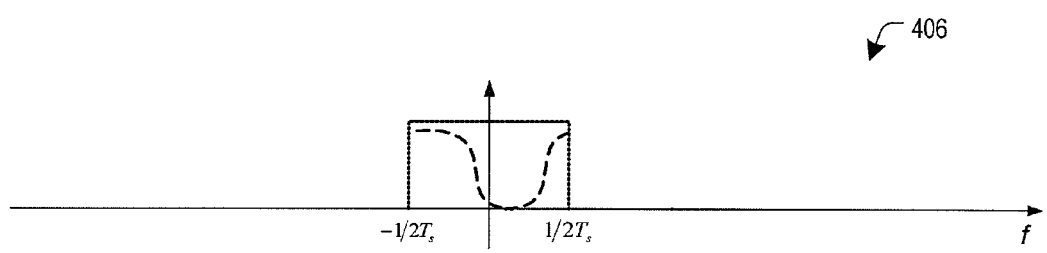

FIG. 4 illustrates the effect of down sampling on the spectrum of a band-pass signal, where the spectrum of a band-pass signal is illustrated at 402. The band-pass signal repeated in frequency $1/T_s$ is illustrated at 404. As illustrated at 406, the spectrum of the down sampled signal with a sampling rate $1/T_s$ can be a cyclically shifted version of the original spectrum depending on the spectrum occupied by the band-pass signal and the down sampling rate. The role of the cyclic subcarrier shift illustrated in FIG. 3 is to compensate for this effect, since the OFDM signal of ED #i in FIG. 3 is band-pass in general.

Although FIG. 4 illustrates one example of the effect of down sampling on the spectrum of a band-pass signal, various changes may be made to FIG. 4. For example, the spectrum of the band-pass signal and the sampling rate $1/T_s$ are for illustration only.

Figure 5:
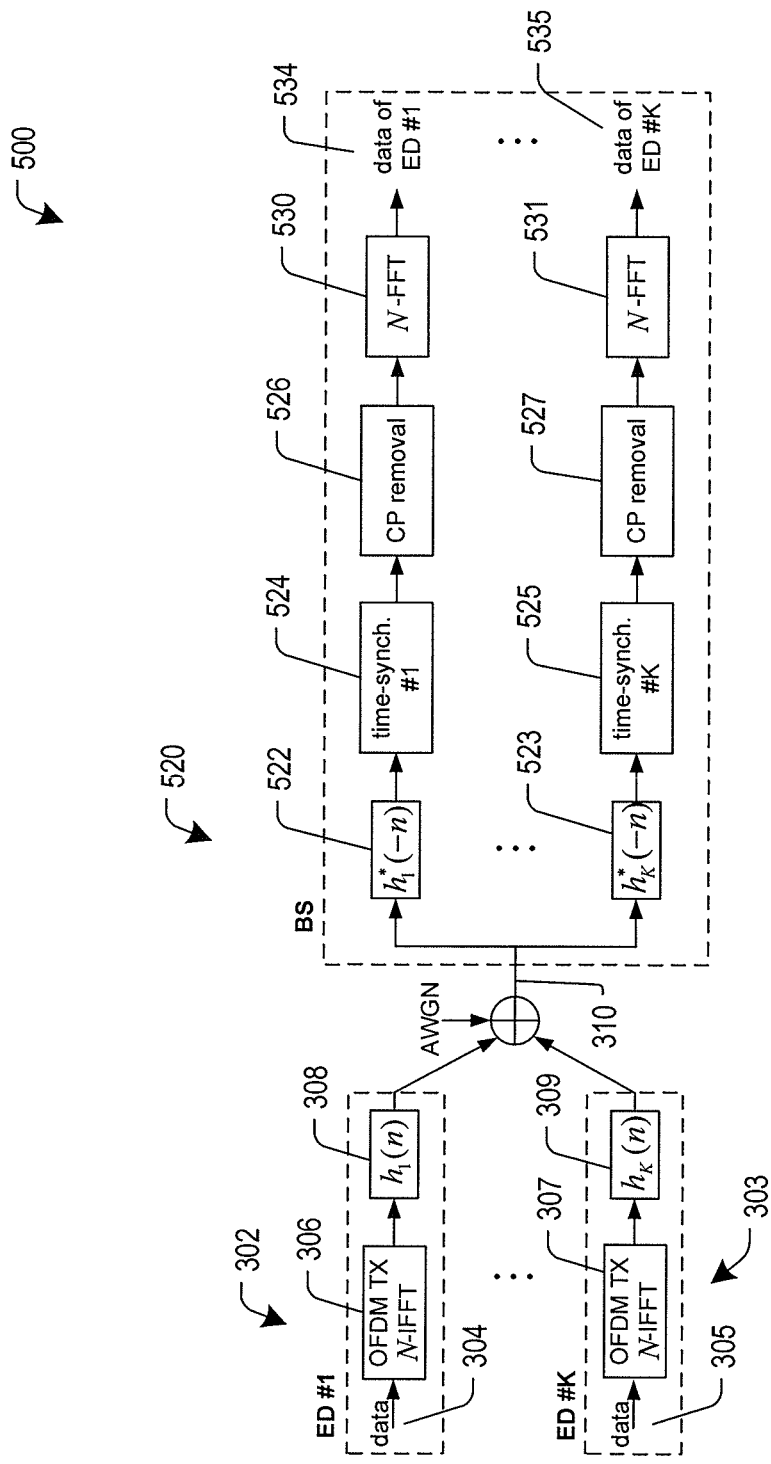
FIG. 5 illustrates an example of a topology or system for implementing asynchronous communication according to another embodiment.

FIG. 5 illustrates another example of a topology or system 500 for wireless transmission of data according to an embodiment of this disclosure. The system 500 comprises the plurality of electronic devices 302 to 303 (e.g., ED #1 to ED #K) of FIG. 3 and at least one receiver 520. The differences between this example and the example illustrated in FIG. 3 are that in this example, there is no down sampling, no short FFT, and no cyclic subcarrier shifting. Instead, a full-size FFT is performed per ED.

The modulated signals transmitted by the EDs 302, 303 are combined such that the receiver 520 receives the combined signal 310. As illustrated, the received signal 310 is passed through K chains of operations corresponding to the K EDs 302, 303. The output of each chain is the demodulated sequence of the corresponding ED (e.g., 534, 535).

To illustrate, the receiver operation of the i'th chain includes filtering, where the received signal 310 is passed through a filter $h_i^*(-n)$, which is matched to the corresponding filter used at ED #i. For example, the receiver operation of the first chain includes filtering, where the received signal 310 is passed through a filter $h_1^*(-n)$ 522, which is matched to the filter 308 used at ED #1 302. Similarly, the receiver operation of the K'th chain includes filtering, where the received signal 310 is passed through a filter $h_K^*(-n)$ 523, which is matched to the filter 309 used at ED #K 303.

The receiver operation of the i'th chain includes per-ED time synchronization that is performed at a time synchronization block. For example, at the output of the filtering described above, the operational window is shifted appropriately to be time-synchronized to the corresponding ED.

To illustrate, the receiver operation of the first chain includes time synchronization that is performed at a time synchronization block 524. At the output of the filter 522, a delay compensated signal is obtained by shifting the operational window appropriately to be time-synchronized to the corresponding ED (e.g., ED #1 302). The appropriate time shift includes the delay of ED #1 302 together with the aggregate delay of the end-to-end filter $g_1(n) \triangleq h_1(n)*h_1^*(-n)$. The delay compensated signal is then divided into OFDM symbols, and the cyclic prefix (CP) is removed from each received OFDM symbol by the cyclic prefix removal block 526.

Similarly, the receiver operation of the K'th chain includes time synchronization that is performed at a time synchronization block 525. At the output of the filter 523, a delay compensated signal is obtained by shifting the operational window appropriately to be time-synchronized to the corresponding ED (e.g., ED #K 303). The appropriate time shift includes the delay of ED #K 303 together with the aggregate delay of the end-to-end filter $g_K(n) \triangleq h_K(n)*h_K^*(-n)$. The delay compensated signal is then divided into OFDM symbols, and the cyclic prefix (CP) is removed from each received OFDM symbol by the cyclic prefix removal block 527.

The receiver operation of the i'th chain includes a full-size FFT performed per ED at an FFT block to transform each symbol to the frequency domain. For example, the receiver operation of the first chain includes performing a full-size FFT at an FFT block 530 after the cyclic prefix is removed. Similarly, the receiver operation of the K'th chain includes performing a full-size FFT at an FFT block 531 after the cyclic prefix is removed. The output of each chain (e.g., 534, 535) is the demodulated sequence of the corresponding ED.

Although FIG. 5 illustrates one example of a system 500 for wireless transmission of data according to an embodiment of this disclosure, various changes may be made to FIG. 5. For example, various components in FIG. 5 could be combined, further sub-divided, moved, or omitted and additional components could be added according to particular needs. Also, the system 500 could include any number of each component shown in FIG. 5.

Figure 6:
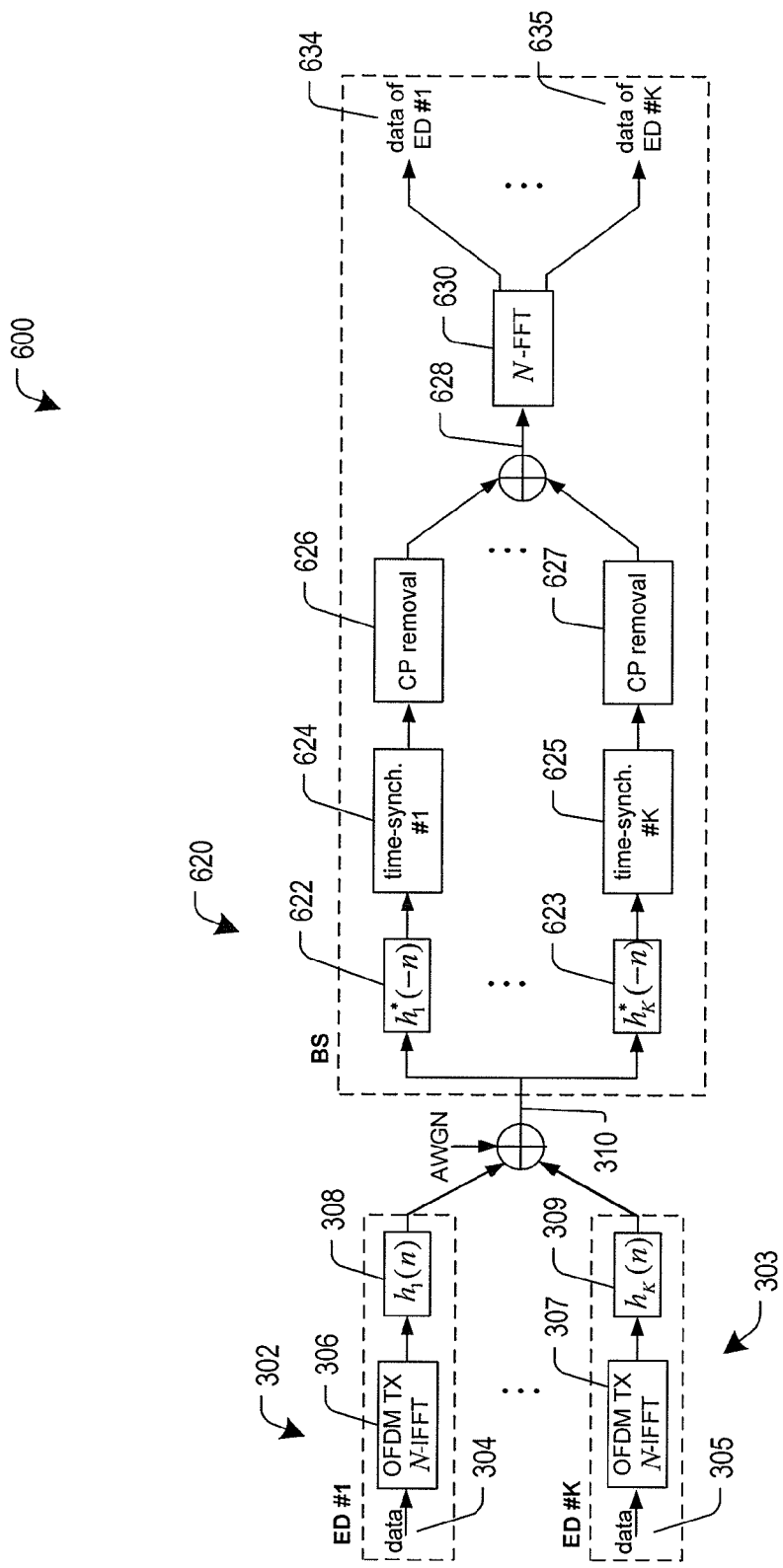
FIG. 6 illustrates an example of a topology or system for implementing asynchronous communication according to yet another embodiment.

FIG. 6 illustrates another example of a topology or system 600 for wireless transmission of data according to an embodiment of this disclosure. The system 600 comprises the plurality of electronic devices 302 to 303 (e.g., ED #1 to ED #K) of FIG. 3 and at least one receiver 620. The differences between this example and the example illustrated in FIG. 5 are that in this example, there is only a single full-size FFT performed at the receiver 620.

The modulated signals transmitted by the EDs 302, 303 are combined such that the receiver 620 receives the combined signal 310. As illustrated, the received signal 310 is passed through K chains of operations corresponding to the K EDs 302, 303. The output of each chain is the demodulated sequence of the corresponding ED (e.g., 634, 635).

To illustrate, the receiver operation of the i'th chain includes filtering, where the received signal 310 is passed through a filter $h_i^*(-n)$, which is matched to the corresponding filter used at ED #i. For example, the receiver operation of the first chain includes filtering, where the received signal 310 is passed through a filter $h_1^*(-n)$ 622, which is matched to the filter 308 used at ED #1 302. Similarly, the receiver operation of the K'th chain includes filtering, where the received signal 310 is passed through a filter $h_K^*(-n)$ 623, which is matched to the filter 309 used at ED #K 303.

The receiver operation of the i'th chain includes per-ED time synchronization that is performed at a time synchronization block. For example, at the output of the filtering described above, the operational window is shifted appropriately to be time-synchronized to the corresponding ED. To illustrate, the receiver operation of the first chain includes time synchronization that is performed at a time synchronization block 624. At the output of the filter 622, a delay compensated signal is obtained by shifting the operational window appropriately to be time-synchronized to the corresponding ED (e.g., ED #1 302). The appropriate time shift includes the delay of ED #1 302 together with the aggregate delay of the end-to-end filter $g_1(n) \triangleq h_1(n)*h_1^*(-n)$. The delay compensated signal is then divided into OFDM symbols, and the cyclic prefix (CP) is removed from each received OFDM symbol by the cyclic prefix removal block 626

Similarly, the receiver operation of the K'th chain includes time synchronization that is performed at a time synchronization block 625. At the output of the filter 623, a delay compensated signal is obtained by shifting the operational window appropriately to be time-synchronized to the corresponding ED (e.g., ED #K 303). The appropriate time shift includes the delay of ED #K 303 together with the aggregate delay of the end-to-end filter $g_K(n) \triangleq h_K(n)*h_K^*(-n)$. The delay compensated signal is then divided into OFDM symbols, and the cyclic prefix (CP) is removed from each received OFDM symbol by the cyclic prefix removal block 627. The outputs of the cyclic prefix removal blocks 626, 627 are summed to form a combined output 628.

The receiver operation includes a single full-size FFT performed at an FFT block to transform each symbol to the frequency domain. For example, the receiver operation of the first chain includes performing a single full-size FFT on the combined cyclic prefix removed symbol at an FFT block 630. Similarly, the receiver operation of the K'th chain includes performing the single full-size FFT on the combined cyclic prefix removed symbol at the FFT block 630. The output of each chain (e.g., 634, 635) is the demodulated sequence of the corresponding ED.

Although FIG. 6 illustrates one example of a system 600 for wireless transmission of data according to an embodiment of this disclosure, various changes may be made to FIG. 6. For example, various components in FIG. 6 could be combined, further sub-divided, moved, or omitted and additional components could be added according to particular needs. Also, the system 600 could include any number of each component shown in FIG. 6.

Figure 7:
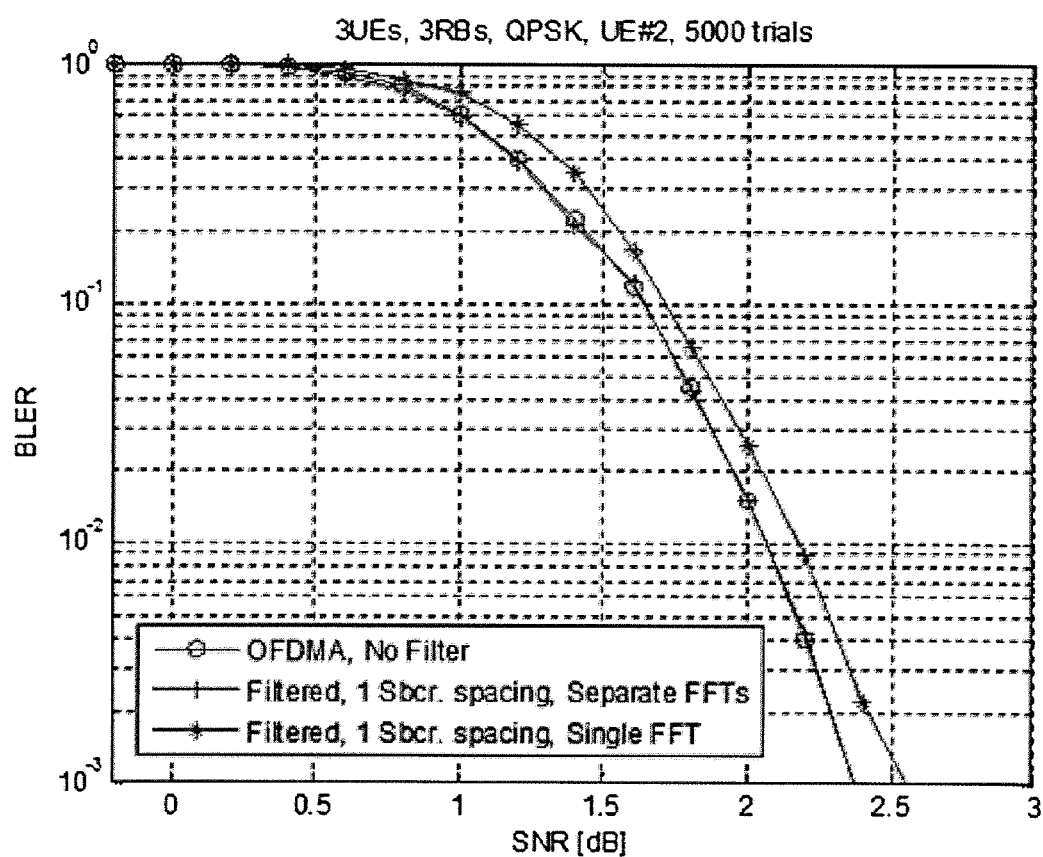
FIGS. 7-9 illustrate BLER curves for various modulations compared with synchronous OFDMA.
Figure 8:
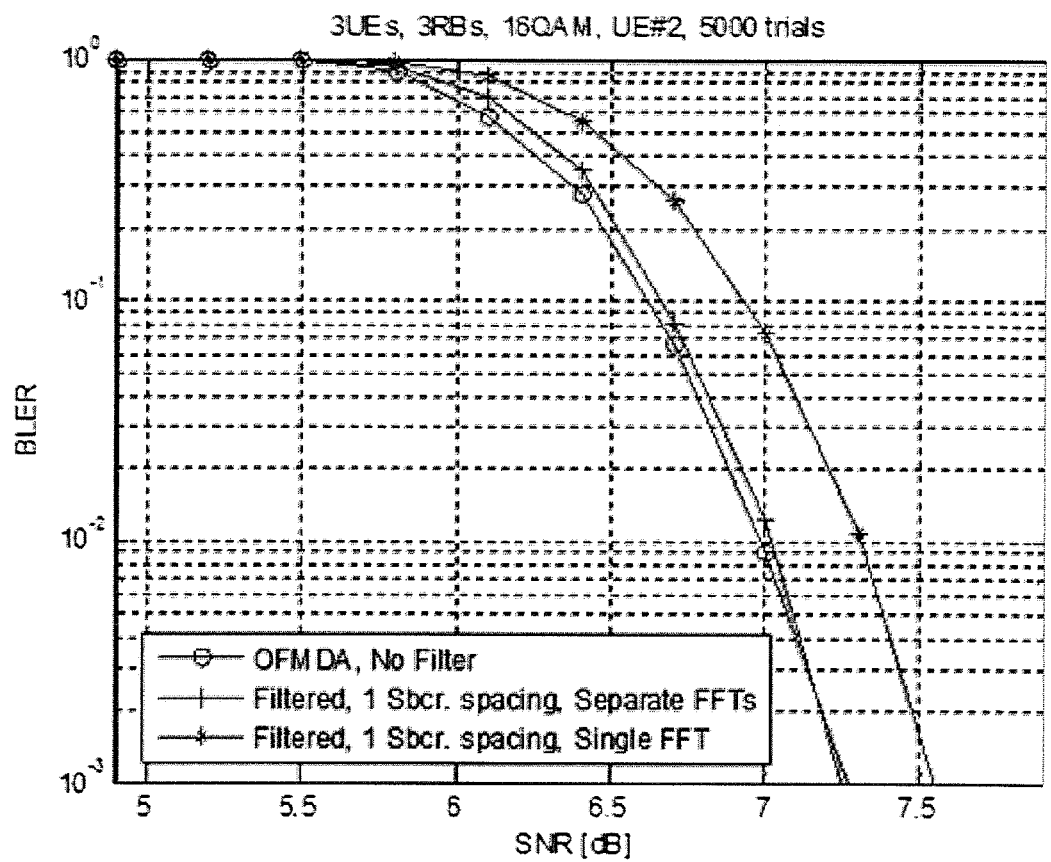
Figure 9:
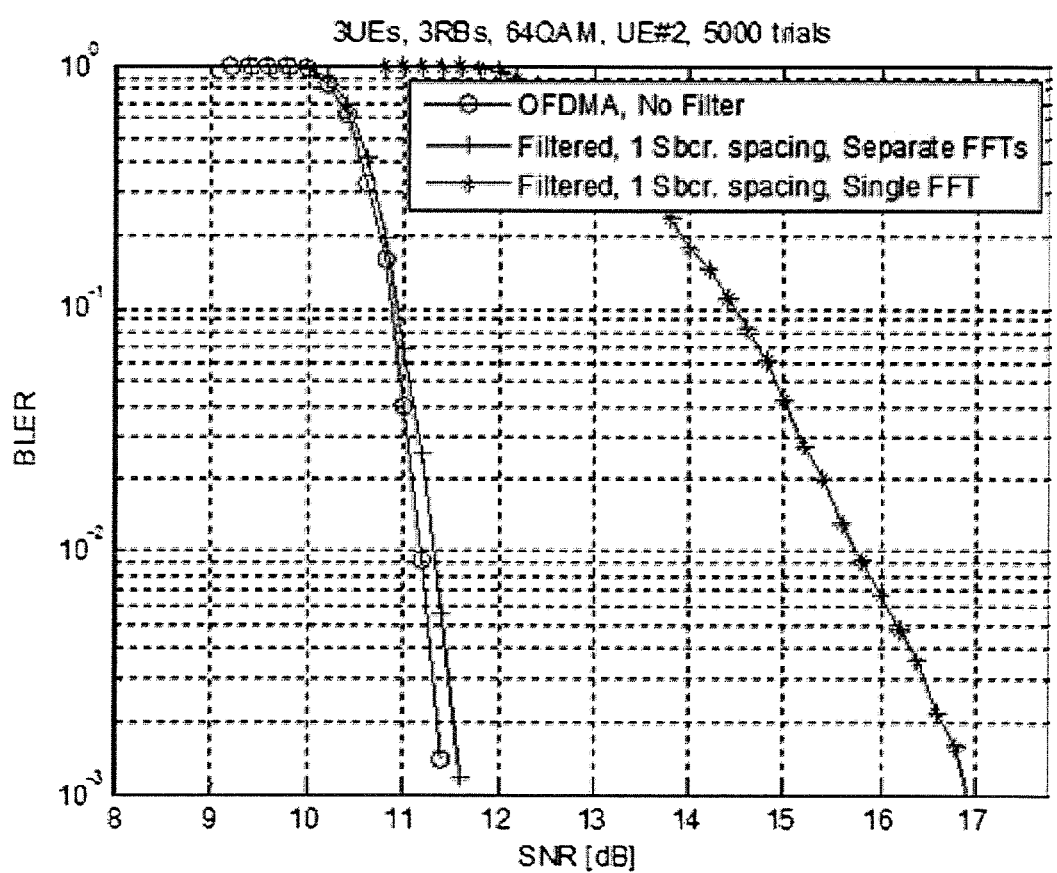

FIGS. 7-9 illustrate Block Error Rate (BLER) curves for various modulations using the proposed asynchronous OFDMA/SC-FDMA system compared with using synchronous OFDMA. FIG. 7 illustrates the BLER performance of the proposed asynchronous OFDMA/SC-FDMA system with Quadrature Phase Shift Keying (QPSK) and Forward Error Correction (FEC) rate 1/2 over an Additive White Gaussian Noise (AWGN) channel. As illustrated in FIG. 7, the asynchronous OFDMA shows substantially the same BLER performance as synchronous OFDMA for QPSK.

FIG. 8 illustrates the BLER performance of the proposed asynchronous OFDMA/SC-FDMA system with 16 QAM and FEC rate 1/2 over an AWGN channel. As illustrated, the performance loss is less than 0.05 dB for 16 QAM.

FIG. 9 illustrates the BLER performance of the proposed asynchronous OFDMA/SC-FDMA system with 64 QAM and FEC rate 1/2 over an AWGN channel. As illustrated in FIG. 9, the performance loss is less than 0.2 dB for 64 QAM.

In arriving at the results illustrated in FIGS. 7-9, an uplink asynchronous OFDMA system was simulated using the proposed scheme in the scenario where three EDs communicate with the receiver. Three resource blocks were assigned to each ED and one guard subcarrier was reserved between each pair of EDs that are adjacent in frequency. An FIR filter was used with time duration T/2, where T is the OFDM symbol duration without CP. The ED FFT size was N=1024 and the receiver FFT sizes were $N_i$=64, 1≤i≤3. The transmission bandwidth was 10 MHz and the signals were passed through an Additive White Gaussian Noise (AWGN) channel with random delays uniformly distributed between 0 and T.

For the sake of comparison, a modified receiver is also simulated wherein the outputs of the per-ED time synchronization blocks are added together and passed through a single OFDM demodulator with FFT size 1024 (as illustrated in FIG. 6). The simulation result for each modulation level is also shown in FIGS. 7-9 as "Filtered, 1 Sbcr Spacing, Single FFT". As illustrated, this receiver has a performance gap which is more significant for higher modulation levels. The performance loss is due to the residual inter-ED interference which remains in the demodulated signal after the single FFT operation. This illustrates the benefit of separate ED processing in the proposed asynchronous OFDMA/SC-FDMA decoder as opposed to single FFT operation.

Figure 10:
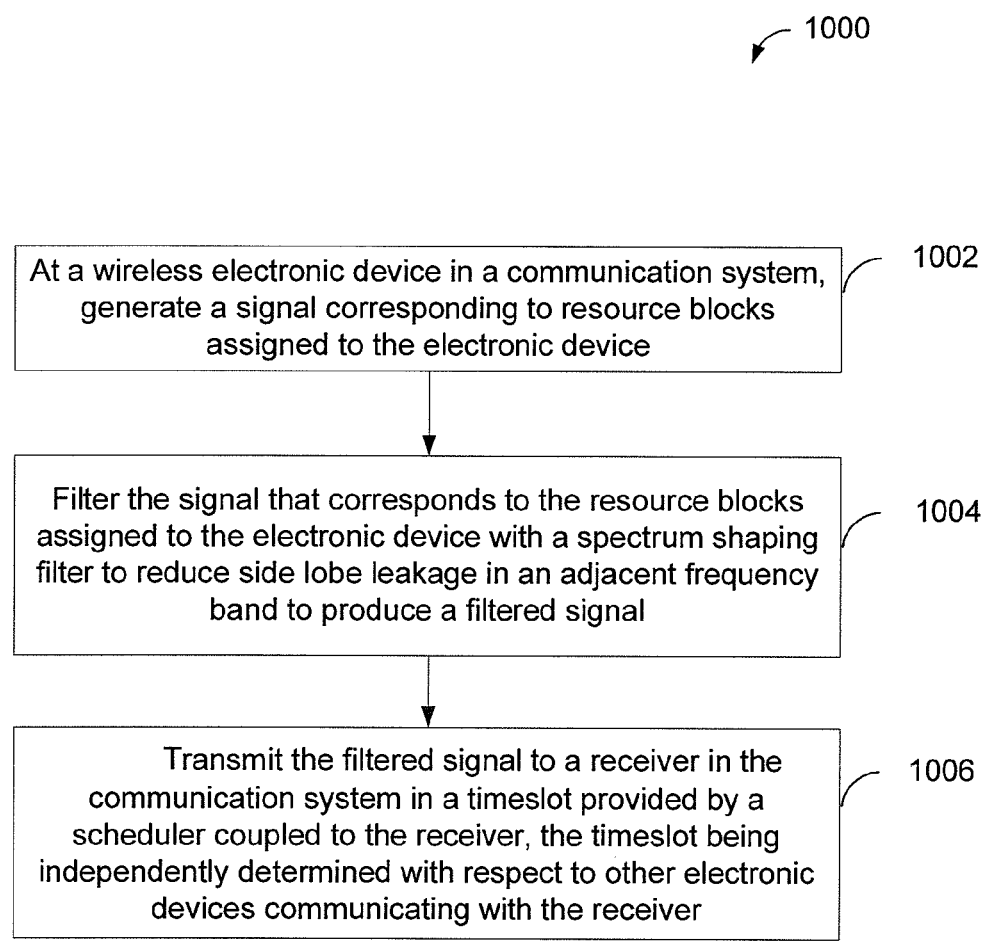
FIG. 10 illustrates a flow diagram illustrating a method of operating an electronic device according to one embodiment.

FIG. 10 is a flow diagram illustrating a method 1000 of operating an electronic device in accordance with disclosed embodiments that may be performed, for example, by an electronic device such as the electronic device 110 of FIG. 1 or the electronic devices 302, 303 of FIGS. 3, 5 and 6.

The method 1000 includes generating a signal corresponding to resource blocks assigned to the wireless device, at step 1002. For example, each ED 302, 303 generates its modulated signal (which is the result of an IFFT operation on the modulation data sequence) corresponding to its assigned resource blocks.

The method 1000 includes filtering the signal that corresponds to the resource blocks assigned to the wireless device with a spectrum shaping filter and producing a filtered signal that eliminates side lobe leakage to a second wireless device adjacent to the wireless device in frequency, at step 1004. For example, each ED 302, 303 passes its OFDM signal through its appropriately designed spectrum shaping filter 308, 309 in order to eliminate side lobe leakage to the adjacent electronic devices in frequency.

The method 1000 includes transmitting the filtered signal to a receiver in the wireless communication system in a timeslot provided by a scheduler coupled to the receiver, the timeslot being independently determined with respect to other electronic devices communicating with the receiver, at step 1006. In one embodiment, the filtered signal is transmitted with a synchronization reference. The synchronization reference is, in one example, a known pattern that allows a transmitter and receiver to synchronize themselves. In another example, synchronization information from a third party source can be used to synchronize the ED with the receiver. For example, the modulated signal transmitted by the ED 302 of FIG. 3 is transmitted to the receiver 320 in a timeslot provided by the scheduler 253. The timeslot provided to the ED 302 is independently determined with respect to other electronic devices (e.g., the ED 303) communicating with the receiver 320. Similarly, the modulated signal transmitted by the ED 303 of FIG. 3 is transmitted to the receiver 320 in a timeslot provided by the scheduler 253. The timeslot provided to the ED 303 is independently determined with respect to other electronic devices (e.g., the ED 302) communicating with the receiver 320. Because the filtered signal transmitted by each of the EDs 302, 303 is transmitted to the receiver 320 in a timeslot provided by the scheduler 253 that is independently determined with respect to other electronic devices communicating with the receiver, and because the filtered signal transmitted by each of the EDs 302, 303 reduces or eliminates side lobe leakage in an adjacent frequency band, overhead with respect to timing advance signaling may be reduced.

Although FIG. 10 illustrates one example of a method 1100 of operating an electronic device in accordance with disclosed embodiments, various changes may be made to FIG. 10. For example, while shown as a series of steps, various steps in FIG. 10 could overlap, occur in parallel, occur in a different order, or occur any number of times.

Figure 11:
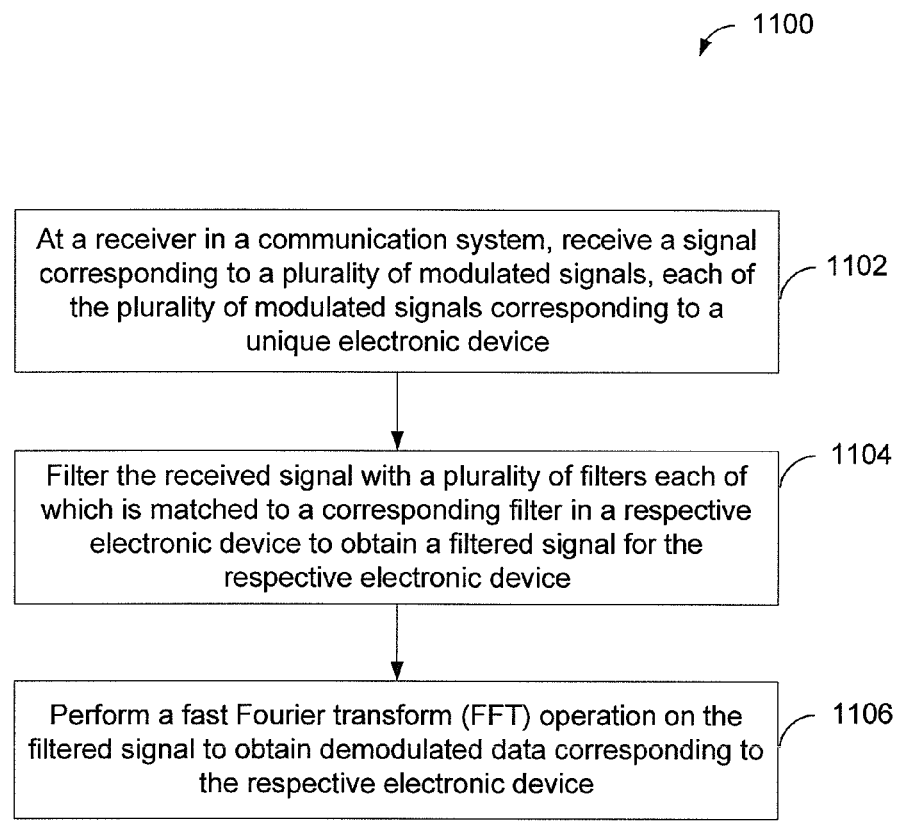
FIG. 11 illustrates a flow diagram illustrating a method of operating a receiver according to one embodiment.

FIG. 11 is a flow diagram illustrating a method 1100 of operating a receiver in accordance with disclosed embodiments that may be performed, for example, by a base station such as the base station 170 of FIG. 1 or the receiver 620 of FIG. 6.

The method 1100 includes receiving a signal corresponding to a plurality of modulated signals, each of the plurality of modulated signals corresponding to a unique electronic device, at step 1102. For example, the received signal 310, which corresponds to the modulated signals transmitted by each of the EDs 302, 303 is received at the receiver 320.

The method 1100 includes filtering the received signal with a filter that is matched to a corresponding filter in a respective electronic device to obtain a filtered signal for the respective electronic device, at step 1104. For example, the receiver operation of the first chain includes filtering the received signal 310 with the filter $h_1^*(-n)$ 322, which is matched to the filter 308 used at ED #1 302.

The method 1100 includes performing a fast Fourier transform (FFT) operation on the filtered signal to obtain demodulated data corresponding to the respective electronic device, at step 1106. For example, as illustrated in FIG. 3, the receiver operation of the i'th chain includes scaling to account for the down sampling effect and the scaled signal is passed through an $N_i$-point FFT block (e.g., a "short" FFT) to transform each symbol to the frequency domain. As another example, as illustrated in FIG. 5, the receiver operation of the first chain includes performing a full-size FFT at the FFT block 530 after the cyclic prefix is removed. As yet another example, as illustrated in FIG. 6, the receiver operation of the first chain includes performing a single full-size FFT on the combined time synchronization output with the cyclic prefix removed at the FFT block 630.

Although FIG. 11 illustrates one example of a method 1100 of operating a receiver in accordance with disclosed embodiments, various changes may be made to FIG. 11. For example, while shown as a series of steps, various steps in FIG. 11 could overlap, occur in parallel, occur in a different order, or occur any number of times.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of transmitting data, the method comprising:
   receiving, by a receiver, a first Orthogonal Frequency Division Multiplexing (OFDM) modulated signal from a first wireless electronic device over a first plurality of subcarriers; and
   receiving, by the receiver, a second OFDM modulated signal from a second wireless electronic device over a second plurality of subcarriers, wherein main lobes of the first OFDM modulated signal and the second OFDM modulated signal have bandwidths in the frequency domain that are equal to respective bandwidths associated with the first plurality of subcarriers and the second plurality of subcarriers, and wherein side lobes of the first OFDM modulated signal and the second OFDM modulated signal have amplitudes below a threshold outside the respective bandwidths of the first plurality of subcarriers and the second plurality of subcarriers.

2. The method of claim 1, further comprising receiving a resource assignment from a scheduler.

3. The method of claim 1, wherein the first OFDM modulated signal and the second OFDM modulated signal are Cyclic Prefix OFDM (CP-OFDM) signals.

4. The method of claim 1, wherein a transmission of the first OFDM modulated signal is asynchronous with a transmission of the second OFDM modulated signal.

5. A receiver comprising:
   a processor; and
   a non-transitory computer readable storage medium storing programming for execution by the processor, the programming including instructions to:
      receive a first Orthogonal Frequency Division Multiplexing (OFDM) modulated signal from a first wireless electronic device over a first plurality of subcarriers; and
      receive a second OFDM modulated signal from a second wireless electronic device over a second plurality of subcarriers, wherein main lobes of the first OFDM modulated signal and the second OFDM modulated signal have bandwidths in the frequency domain that are equal to respective bandwidths associated with the first plurality of subcarriers and the second plurality of subcarriers, and wherein side lobes of the first OFDM modulated signal and the second OFDM modulated signal have amplitudes below a threshold outside the respective bandwidths of the first plurality of subcarriers and the second plurality of subcarriers.

6. The receiver of claim 5, wherein a transmission of the first OFDM modulated signal is asynchronous with a transmission of the second OFDM modulated signal.

7. The receiver of claim 5, wherein the programming further includes instructions to receive a resource assignment from a scheduler.

8. The receiver of claim 5, wherein the first OFDM modulated signal and the second OFDM modulated signal are filtered Cyclic Prefix OFDM (CP-OFDM) signals.

9. A method of transmitting data, the method comprising;
   transmitting, by a first wireless electronic device, a first Orthogonal Frequency Division Multiplexing (OFDM) modulated signal over a first plurality of subcarriers, a second OFDM modulated signal having been transmitted over a second plurality of subcarriers by a second wireless electronic device, wherein main lobes of the first OFDM modulated signal and the second OFDM modulated signal have bandwidths in the frequency domain that are equal to respective bandwidths associated with the first plurality of subcarriers and the second plurality of subcarriers, and side lobes with amplitudes below a threshold outside the respective bandwidths of the first plurality of subcarriers and the second plurality of subcarriers.

10. The method of claim 9, wherein the first OFDM modulated signal is transmitted asynchronously with the second OFDM modulated signal.

11. The method of claim 9, wherein the first OFDM modulated signal and the second OFDM modulated signal are filtered Cyclic Prefix OFDM (CP-OFDM) signals.

12. The method of claim 9, wherein the first OFDM modulated signal is generated by applying an Inverse Fast Fourier Transform (IFFT) to data.

13. The method of claim 9, further comprising:
    filtering the first OFDM modulated signal to attenuate the amplitude of the side lobes of the first OFDM modulated signal below the threshold prior to transmitting the first OFDM modulated signal over the first plurality of subcarriers.

14. The method of claim 13, wherein filtering the first OFDM modulated signal comprises localizing the first OFDM modulated signal in the frequency domain.

15. The method of claim 13, wherein filtering the first OFDM modulated signal includes applying a spectrum shaping filter to the first OFDM modulated signal.

16. The method of claim 15, wherein the spectrum shaping filter is a Finite Impulse Response (FIR) filter.

17. The method of claim 9, wherein transmitting the first OFDM modulated signal includes transmitting the first OFDM modulated signal over the first plurality of subcarriers without synchronizing transmission of the first OFDM modulated signal with the second OFDM modulated signal.

18. The method of claim 9, wherein transmitting the first OFDM modulated signal comprises transmitting the first OFDM modulated signal to a receiver indicated by a scheduler.

19. The method of claim 18, wherein transmitting the first OFDM modulated signal comprises transmitting the first OFDM modulated signal without regard to synchronization information from the scheduler.

20. A first wireless electronic device comprising:
    a processor; and a non-transitory computer readable storage medium storing programming for execution by the processor, the programming including instructions to:
transmit a first Orthogonal Frequency Division Multiplexing (OFDM) modulated signal over a first plurality of subcarriers, a second OFDM modulated signal having been transmitted over a second plurality of subcarriers by a second wireless electronic device, wherein main lobes of the first OFDM modulated signal and the second OFDM modulated signal have bandwidths in the frequency domain that are equal to respective bandwidths associated with the first plurality of subcarriers and the second plurality of subcarriers, and side lobes with amplitudes below a threshold outside the respective bandwidths of the first plurality of subcarriers and the second plurality of subcarriers.

21. The first wireless electronic device of claim 20, wherein the first OFDM modulated signal is transmitted asynchronously with the second OFDM modulated signal.

22. The first wireless electronic device of claim 20, wherein the first OFDM modulated signal and the second OFDM modulated signal are filtered Cyclic Prefix OFDM (CP-OFDM) signals.

23. The first wireless electronic device of claim 20, wherein the first OFDM modulated signal is generated by applying an Inverse Fast Fourier Transform (IFFT) to data.

24. The first wireless electronic device of claim 20, wherein the programming further includes instructions to:
filter the first OFDM modulated signal to attenuate the amplitude of the side lobes of the first OFDM modulated signal below the threshold prior to transmitting the first OFDM modulated signal over the first plurality of subcarriers.

25. The first wireless electronic device of claim 24, wherein the instructions to filter the first OFDM modulated signal include instructions to localize the first OFDM modulated signal in the frequency domain.

26. The first wireless electronic device of claim 24, wherein the instructions to filter the first OFDM modulated signal include instructions to apply a spectrum shaping filter to the first OFDM modulated signal.

27. The first wireless electronic device of claim 26, wherein the spectrum shaping filter is a Finite Impulse Response (FIR) filter.

28. The first wireless electronic device of claim 20, wherein the instructions to transmit the first OFDM modulated signal includes instructions to transmit the first OFDM modulated signal over the first plurality of subcarriers without synchronizing the first OFDM modulated signal with the second OFDM modulated signal.

29. The first wireless electronic device of claim 20, wherein the instructions to transmit the first OFDM modulated signal include instructions to transmit the first OFDM modulated signal to a receiver indicated by a scheduler.

30. The first wireless electronic device of claim 29, wherein the instructions to transmit the first OFDM modulated signal include instructions to transmit the first OFDM modulated signal without regard to synchronization information from the scheduler.

* * * * *